H. BRANDES.
Back-Band Loops for Harness.
No. 149,025                  Patented March 31, 1874.
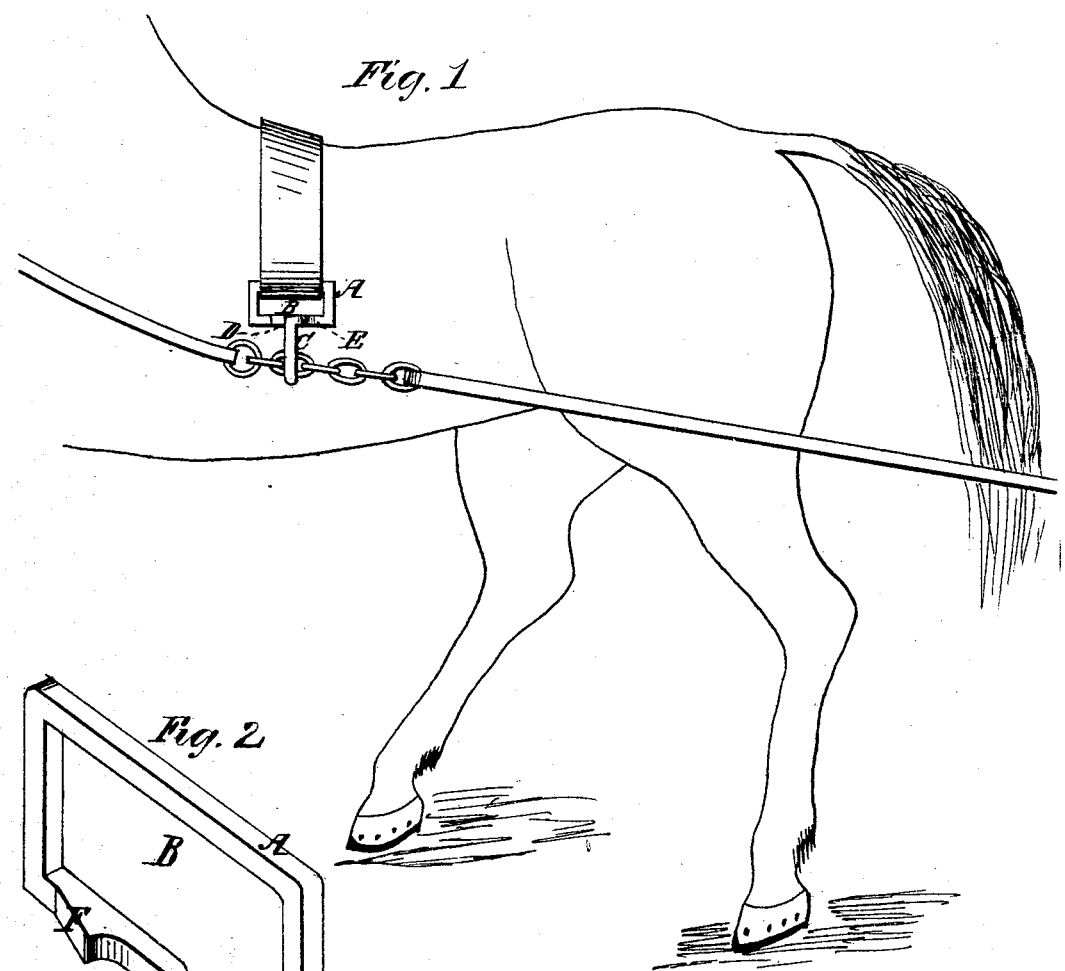
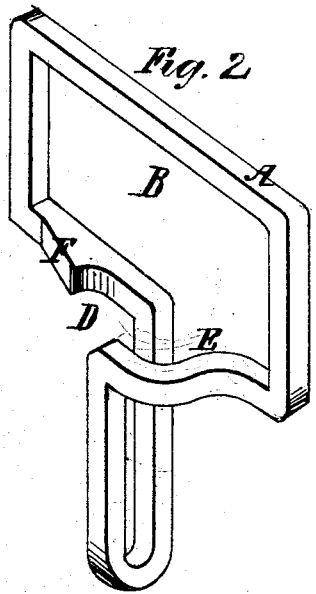
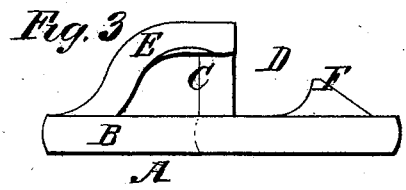

UNITED STATES PATENT OFFICE.

HENRY BRANDES, OF CAPE GIRARDEAU, ASSIGNOR TO COTTON H. ALLEN, OF ST. LOUIS, AND HENRY BRANDES, OF CAPE GIRARDEAU, MO.

IMPROVEMENT IN BACK-BAND LOOPS FOR HARNESS.

Specification forming part of Letters Patent No. 149,025, dated March 31, 1874; application filed November 18, 1873.

*To all whom it may concern:*

Be it known that I, HENRY BRANDES, of Cape Girardeau, in the county of Cape Girardeau, State of Missouri, have invented a new and Improved Back-Band Loop for Plow-Harness; and I do hereby declare that the following is a full, clear, and exact description of the same, reference being had to the accompanying drawings making part of this specification, in which—

Figure 1 is a side view of my improved back-band loop as applied to a back-band, the draft-trace being shown resting upon it. Fig. 2 is a perspective view of the improved loop as it hangs on the left side of the back-band. Fig. 3 is a top view of the same as it hangs on the right side of the back-band.

Similar letters of reference indicate corresponding parts in the several figures.

My loop is designed as a substitute for the hook which is used on the back-band of plow-harness for the purpose of holding up the draft-traces or chains thereof, such hooks being shown in Seth Ward's patent of February 26, 1867. The object of my invention is to prevent the harness catching into the hooks while plowing.

With hooks as ordinarily used farmers find great difficulty and annoyance when working, as they frequently hook into other parts of the harness of the horse while turning around, and, when doubled, hook into the harness of the other horse, and in many instances cause serious damage by becoming entangled.

My improvement consists in a metal frame nearly in form of a Roman T, the cross of the T being in form of a loop, and one end of the back-band passing through it, and the leg of the T also being a loop with the passage for the chain section of the draft-trace at right angles to the passage in the cross portion, and the loop of the cross portion and of the leg uniting with one another at the top of the leg of the T by means of an oblique passage, which is formed by bending out about one-half of the bottom portion of the frame which forms the back-band loop, the bent portion being in form of a cyma reversa, the other half of the said bottom portion, forming the back-band loop, being provided with an extension, nearly in form of a V, on its outer side, all as and for the purpose hereinafter described.

In the drawings, A is the loop-frame, formed of a narrow bar of cast or other metal. B is the back-band loop, and C the trace-chain loop formed by said frame A. D is the lateral oblique passage in the frame, through which the chain is passed into the loop C. E is the cyma-reversa shaped lower portion of the back-band loop, standing out horizontally from the face of that portion of the frame which forms the back-band loop, and having the upper end of one side of the trace-chain loop united to it. F is the nearly V-shaped horizontal extension on the outer side of the other (straight) lower portion of the back-band loop. The inner side of this extension is curved slightly in a converse direction to the curvature of the inner side of the portion E, as shown. By this construction of the looping-frame it will be seen that the chain section of a draft-trace of a plow-harness can be inserted into the loop C by first passing the trace through the loop B until the chain portion stands over the passage D, and then slipping one of the links of the chain down into the loop C through the passage D. When the chain is down in the loop the links which are at right angles to the one which is in the loop will prevent the trace moving longitudinally through the loop to any greater extent than the length of the link which is in the loop, and while this is the case the bent portion E and the projecting portion F will prevent the chain from slipping up into the loop B. The curved forms of the portions E and F are such that they facilitate the insertion and withdrawal with the hand of the chain section of the trace. The loop B is made much larger than the loop C, in order that the trace and the chain-links may all be passed in and out of the loop, as occasion may require.

My invention will prevent all possibility of the harness of the horse or horses becoming entangled, and thus will avoid much inconvenience, and also prevent much of the serious damage which often results from the entanglement of the hames of one horse with that of another.

What I claim as my invention, and desire to secure by Letters Patent, is—

1. The back-band loop B C, the portion C being transverse to the portion B, and the looping portion B united with that of C by means of a lateral passage, D, substantially as and for the purpose described.

2. The back-band loop having lateral passage D formed by means of the bent curved portion E and the curved extension F, substantially as and for the purpose described.

HENRY BRANDES.

Witnesses:
W. A. ASTHOLM,
ED. THILENIUS.